May 26, 1953 H. C. STEELE 2,639,583
CONTRAROTATING GAS TURBINE HAVING A POWER TURBINE
AND A PLURALITY OF COMPRESSOR-TURBINES IN SERIES
Filed June 25, 1947 5 Sheets-Sheet 1
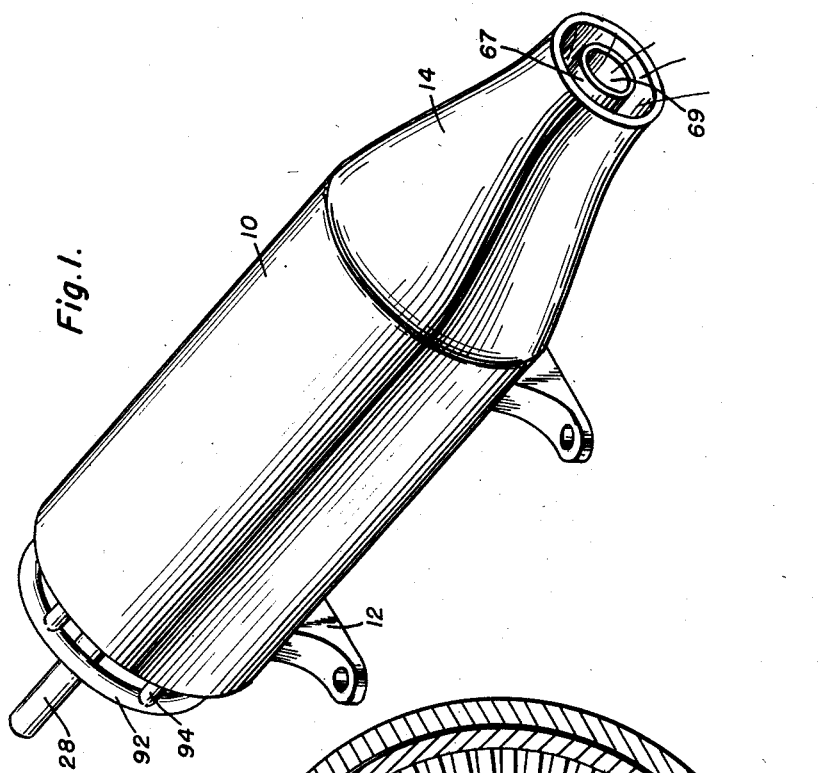
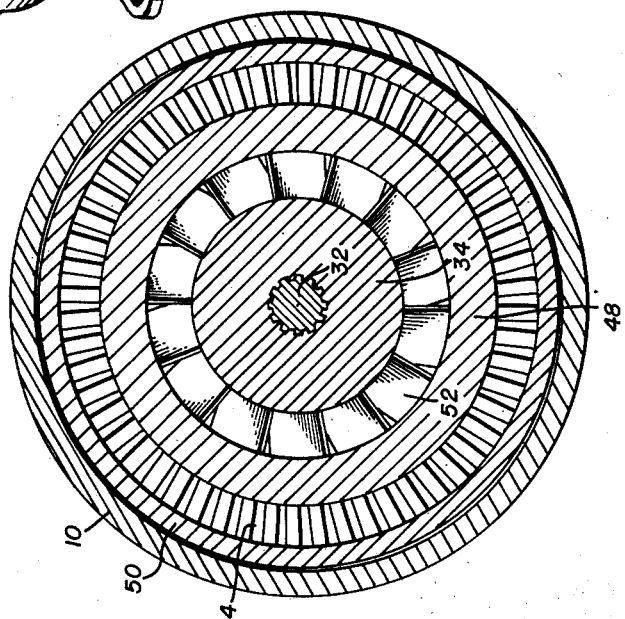
Inventor
Harry C. Steele
By *Clarence A. O'Brien
and Harvey B. Jacobson*
Attorneys Inventor
Harry C. Steele May 26, 1953            H. C. STEELE            2,639,583
CONTRAROTATING GAS TURBINE HAVING A POWER TURBINE
AND A PLURALITY OF COMPRESSOR-TURBINES IN SERIES
Filed June 25, 1947            5 Sheets-Sheet 3

Inventor

Harry C. Steele

By Clarence A. O'Brien
and Harvey B. Jacobson
Attorneys

May 26, 1953   H. C. STEELE   2,639,583
CONTRAROTATING GAS TURBINE HAVING A POWER TURBINE
AND A PLURALITY OF COMPRESSOR-TURBINES IN SERIES
Filed June 25, 1947   5 Sheets-Sheet 4

Inventor

Harry C. Steele

By Clarence A.O'Brien
and Harvey B. Jacobson
Attorneys

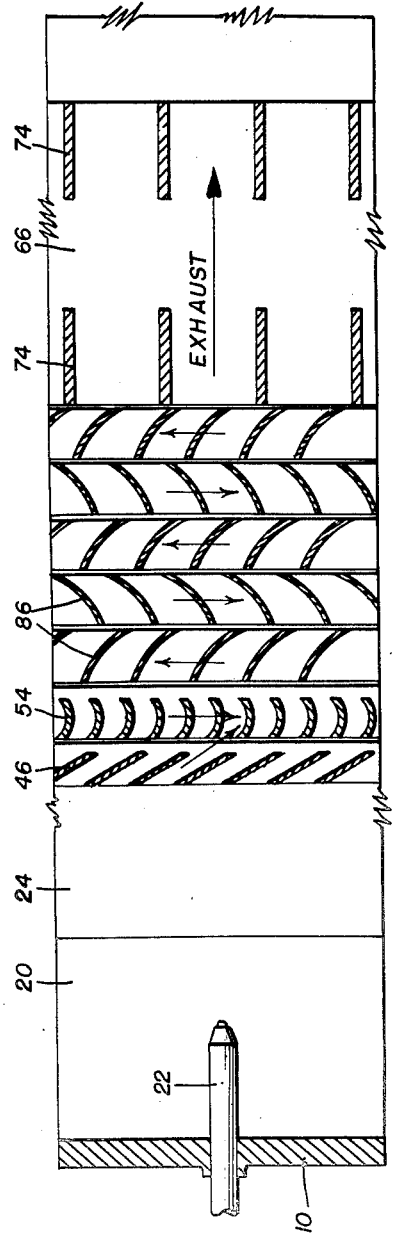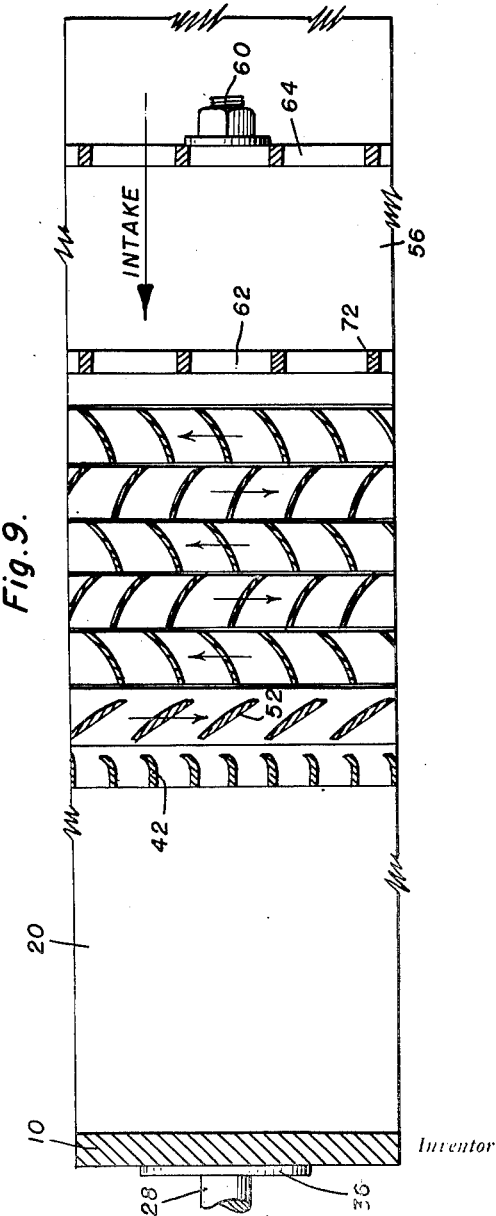

Patented May 26, 1953

2,639,583

UNITED STATES PATENT OFFICE 2,639,583

CONTRAROTATING GAS TURBINE HAVING A POWER TURBINE AND A PLURALITY OF COMPRESSOR-TURBINES IN SERIES

Harry C. Steele, Ashland, Ky.

Application June 25, 1947, Serial No. 756,898

3 Claims. (Cl. 60—39.16)

This invention relates to gas turbines of the internal combustion type, and more specifically has reference to a gas turbine provided with a plurality of coaxial, contra-rotating turbine blades.

The fundamental purpose of this invention resides in providing a gas turbine having a plurality of coaxial turbine blades wherein longitudinally adjacent turbine blades are rotated in opposite directions, to thereby more efficiently employ the kinetic and heat energy of the exhaust products of combustion in the engine.

Further important purposes of this invention reside in providing an apparatus in accordance with the preceding object wherein the arrangement of parts is so designed as to provide improved thermal efficiency within the machine, whereby the charge of air may be preheated, and whereby the incoming charge of air may serve to cool the rotating turbine blades and associated structure.

Yet another important purpose of the invention consists in providing an apparatus in conformity with the foregoing objects wherein a plurality of radially spaced annular sets of vanes are provided upon each turbine wheel for accommodating reverse flows of gases through each wheel.

A still further purpose of invention resides in providing a structure of the character above set forth wherein novel and effective sealing means are provided for preventing escape of gases between the radially spaced sets of vanes.

These, together with various ancillary objects of the invention, which will later be apparent as the following description proceeds, are attained by this device, various embodiments of which have been illustrated, by way of example only of the principles of the invention, in the accompanying drawings, wherein:

Figure 1 is a perspective view of a first embodiment of the gas turbine;

Figure 5 is a transverse vertical sectional view taken substantially upon the plane of the section line 5—5 of Figure 2;

Figure 8 is a longitudinal sectional view through the turbine taken substantially upon the curved surface indicated by the section line 8—8 of Figure 3;

Figure 9 is a longitudinal sectional view taken through the turbine substantially upon the curved surface indicated by the section line 9—9 of Figure 3.

Referring now more specifically to the accompanying drawings, wherein like numerals indicate similar parts throughout the various views, attention is directed, for a better understanding of the principles of this invention, to the embodiment of the invention shown in Figures 1–9.

Figure 2:
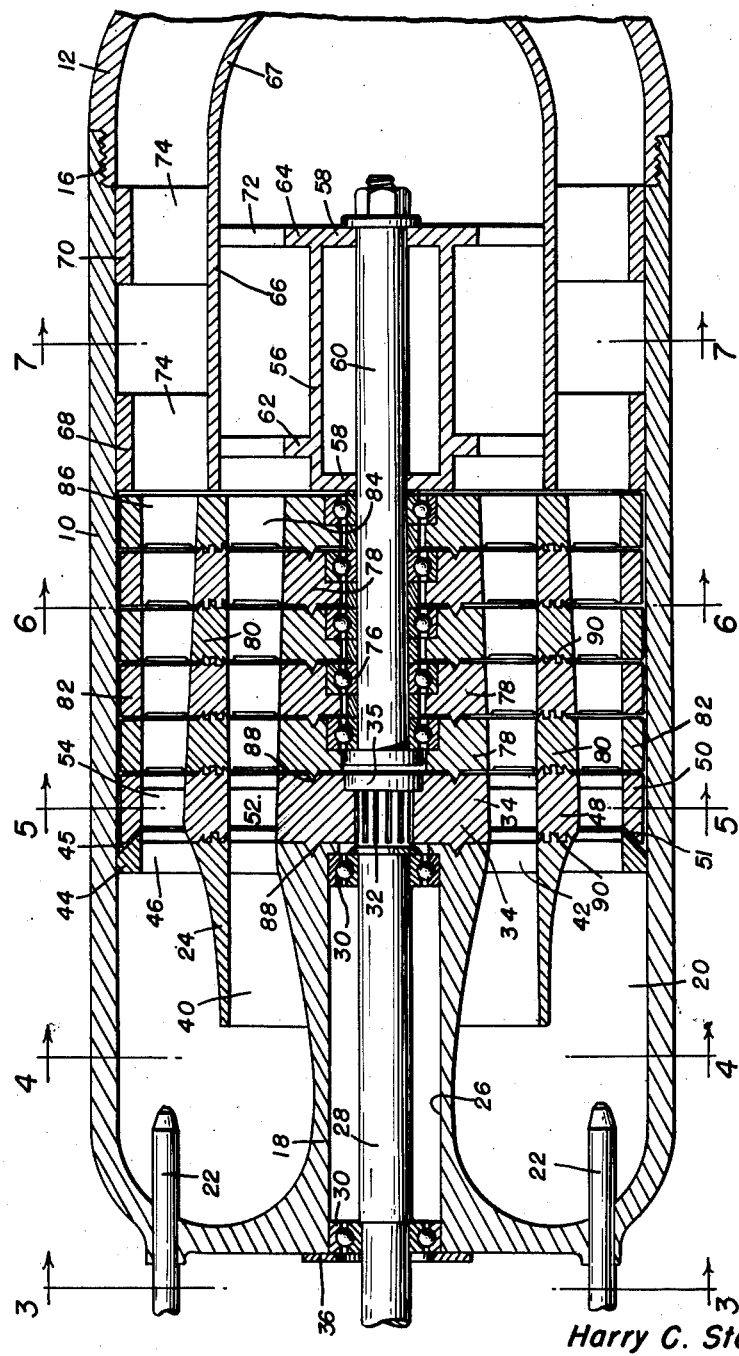
Figure 2 is a vertical longitudinal sectional view through the turbine of Figure 1, a portion of the discharge end thereof being omitted.

The turbine, as shown in Figure 1, is formed with a surrounding stationary casing, which may be of any suitable shape and material, but which in the interest of compactness has been illustrated as comprising a cylindrical body portion 10 which may be supported in any suitable manner as by standards 12 or the like, and wherein the rear end thereof is shown as of conical shape as at 14. From Figure 2 it will be seen that the conical tail portion 14 may be detachably connected to the main body 10 of the engine, as by a screw threaded connection 16. The cylindrical casing is inturned at its forward end to provide an annular inner sleeve 18 which is concentric and axially disposed in the casing 10. As will thus be seen, an annular chamber 20 is produced between the concentric sleeve 18 and casing 10 at the front end of the engine, this annular chamber comprising a combustion space which may be supplied with an explosive mixture in any suitable manner, either by a carburetor for supplying a combustible mixture, or by a plurality of appropriately spaced and positioned fuel injector nozzles 22 for injecting liquid fuel directly into charges of air supplied to the chamber 20.

Preferably integrally formed upon and concentrically surrounding the sleeve 18 at its inward extremity, is an annular sleeve 24 defining with sleeve 18 an air inlet passage for the combustion chamber 20 in a manner to be subsequently set forth.

The sleeve 18 provides an axial bore 26 opening from the forward end of the casing 10, which bore suitably journals a primary driving shaft 28 which extends forwardly from the casing 10, by means of roller or thrust bearings 30, and whose rear end is provided with splines 32 for non-rotatably receiving a turbine wheel 34, detachably retained thereon as by a locking nut 35.

Figure 3:
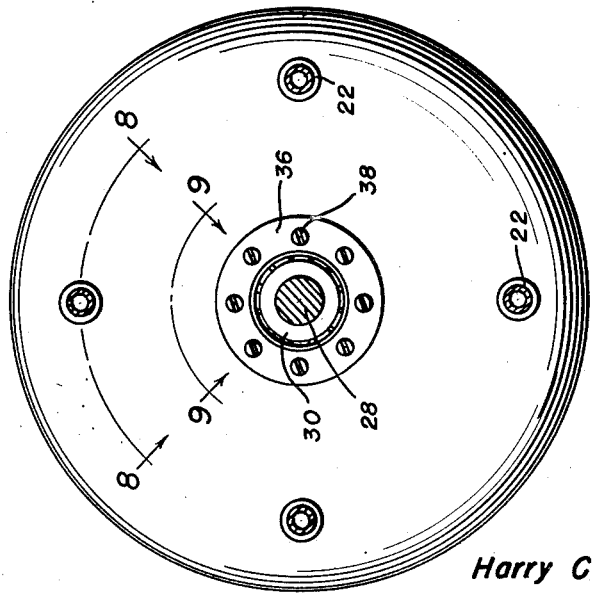
Figure 3 is a front elevational view of the turbine, taken substantially upon the plane of the section line 3—3 of Figure 2.

Thus wheel 34 has its periphery in close juxtaposition to the inner perimeter of the casing 10. The front end of the bore 26 is closed as by a grease retaining cap and bearing retainer 36 detachably secured as by screws 38, see Figure 3.

It will be here noted that sleeve 24 extends considerably within the combustion chamber 20 and that the inner wall of the annular sleeve 24 is of cylindrical shape, while the outer surface of the extremity of the sleeve 18 is outwardly flaring, to provide an annular passageway 40 which is of funnel or Venturi shape. By this means, the velocity of the air or other fluids admitted through the inlet or throat end of the passageway 40 is transformed into a pressure within the combustion chamber 20 for assisting in charging and supercharging the same.

Figure 4:
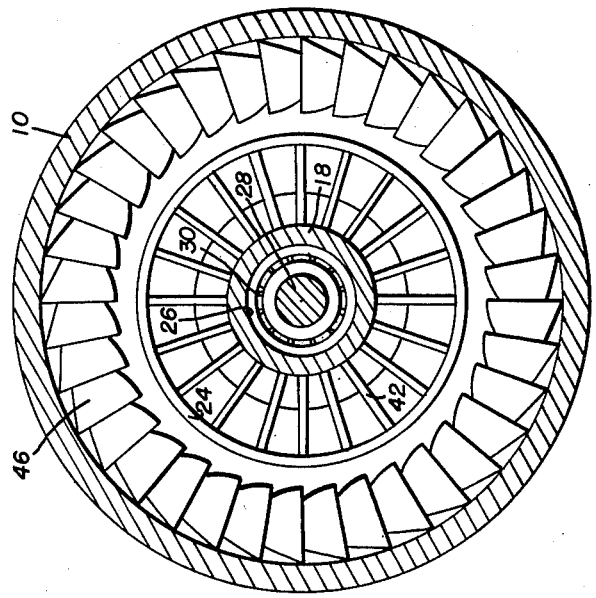
Figure 4 is a transverse vertical sectional view through the turbine taken substantially upon the plane of the section line 4—4 of Figure 2.

As shown best in Figures 2 and 4, a plurality of radial ribs 42 are provided to connect the extremity of the sleeve 18 with the annular ring 24, and to define a plurality of longitudinally extending passes which are parallel and equidistantly spaced about the central longitudinal axis of the engine. As further shown in Figure 2, an annular concentric rim or ring 44 is provided upon the sleeve 24 at its inner end, and a plurality of diffuser vanes or blades 46 are provided radially connecting the outer ring 44 with the annular ring 24, as shown in Figure 4. The outer perimeter of ring 44 has a tight sliding fit with the inner circumference of the casing 10, and the face of the ring adjacent the rotor 34 is beveled at 45 to establish a sliding seal therewith.

It is intended that a plurality of parallel inlet passages shall be provided between consecutive ribs 42, and the concentric sleeves 18 and 24, which merge into the annular air or mixture inlet passageway 40, while the diffuser vanes 46 will define concentric, longitudinally extending combustion products discharge passages which are concentrically disposed circumferentially about the above mentioned inlet passages and are parallel to each other.

Attention is now directed more specifically to Figure 5 for a clearer understanding of the primary turbine rotor whose hub is indicated at 34 and which is non-rotatably and fixedly mounted upon the splined portion 32 of the driving shaft 28. Concentrically positioned about the hub 34, are a pair of annular rings 48 and 50 which are radially spaced from each other and from the hub 34. This annular spacing provides concentric annular passageways which are aligned with and register with the inlet annular passage 40 and the exhaust products discharge passages opening from the diffuser vanes 46. Thus, a plurality of radially disposed vanes 52 integrally connect the hub 34 with the ring 48, while similar vanes but reversed in position as indicated at 54 connect ring 48 with the outer ring 50. The latter as above mentioned extends into close proximity to the inner surface of casing 10 and is further provided with an inclined sealing surface 51 complementary to the above mentioned surface 45.

The vanes 52 and 54 are reversed in position, whereby upon rotation of the turbine rotor 34, the corresponding vanes will produce fluid flows in reverse directions, through the inlet and exhaust ports of the combustion chamber 20.

Figure 7:
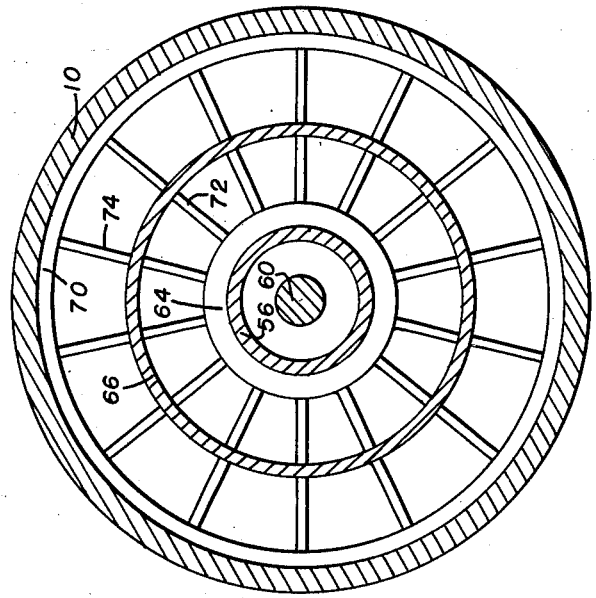
Figure 7 is a transverse vertical sectional view taken through the turbine substantially upon the plane of the section line 7—7 of Figure 2.
Figure 6:
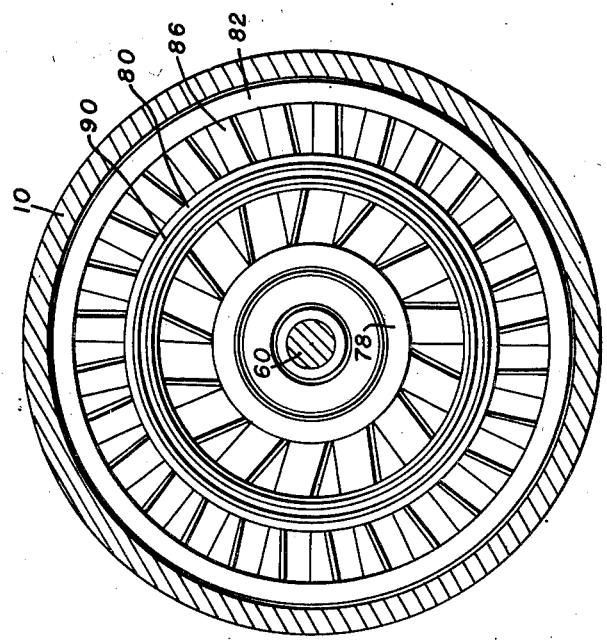
Figure 6 is a transverse vertical sectional view taken through the turbine substantially upon the plane of the section line 6—6 of Figure 2.

Attention is next directed more specifically to the detachably mounted contra-rotating rotor assembly which is insertable within the rotor casing 10 of Figure 2. This detachable rotor assembly consists of an annular cylindrical sleeve member 56 provided with radial inner terminal flanges 58 to non-rotatably receive and support an axial shaft 60 in alignment with but spaced from the power shaft 28. Upon the outer surface of the sleeve 56, are provided longitudinally spaced radial supporting flanges 62 and 64 while a concentric cylindrical casing 66 is rigidly attached to and surrounds the sleeve 56. The case 66 at its rear end is tapered as at 67 to provide a fuel or air inlet passage 69 as shown in Figure 1, and concentric to the above mentioned portion 14. Concentrically disposed about the sleeves 56 and 66, are a pair of longitudinally spaced annular supporting bands 68 and 70 adapted for snug frictional engagement with the inner surface of the cylindrical casing 10, for supporting and retaining the removable rotor assembly therein. For this purpose, a plurality of radially extending vanes 72 and 74 respectively connect the sleeve 56 with the sleeve 66, and the latter with the concentric bands 68 and 70. These vanes 72 and 74, as shown best in Figure 7, provide concentric annular series of longitudinal passageways, the outer series registering with the above mentioned annular series discharge ports from the diffuser vanes 46, while the inner series registers with the annular inlet passage 40.

Mounted upon the forwardly projecting end of the stationary axle or shaft 60 are a series of freely revolving rotor wheels, each independently and rotatably journaled upon the shaft 60 as by anti-friction bearing means 76. Any suitable number of these freely revolving rotor wheels may be provided, the construction shown in Figure 2 consisting of five wheels, each having a hub portion 78, a concentric intermediate band 80 and an outer concentric band 82, these bands being integrally connected by circumferential series of radial vanes 84 and 86. The arrangement is such that the outer bands 82 are freely revolvable within the inner circumference of the cylindrical casing 10, while the inner and outer series of vanes form continuations of the air or fuel inlet passageway leading to the inlet annular passage 40, and continuations of the discharge passageways leading from the diffuser vanes 46. As will be seen from an inspection of Figure 2, the inlet passageway formed through each of the rotor vanes communicates with the annular space between the sleeves 56 and 66, which in turn communicates with the inner chamber of the intake end 67 of the sleeve 66. The exhaust passages formed through the vanes 86 communicate with the annular space between the sleeve 66 and rims 68 and 70, which in turn discharges into the annular discharge passage between the tapering concentric members 67 and 14.

It is a very important feature of the invention that longitudinally adjacent vanes 86 shall be reversely disposed relative to each other, and to the exhaust vanes 54 of the primary turbine 34, whereby as the exhaust products pass from the combustion chamber 20, they cause the primary turbine 34 and each of the freely rotating turbine wheels 78 to rotate in opposite directions. Similarly, the inlet vanes 84 are oppositely disposed relative to each other and to the inlet vanes 52 of the primary turbine 34, for a similar purpose and are also reversed to the corresponding vanes 86 of the same rotor for causing or accommodating reverse flow of fluids in their concentric annular passages.

It may thus be seen that upon burning of a combustible charge in the chamber 20, the products of combustion escapes therefrom under pressure through the diffuser vanes 46 of the outer series of ports, then through the outer series of turbine blades 54 upon the primary turbine rotor, hence to the oppositely rotating outer blades 86 of the freely rotating turbine 78, and from thence pass into the annular exhaust discharge passages above mentioned.

It should be here noted that the rotation of each of the freely revolving rotors 78, induced by the discharging combustion products, causes rotation of the vanes 84 thereof, each of these vanes constituting one stage of a multiple stage air or fuel compressor for inducting an incoming charge into the combustion chamber 20 and for supercharging the same. Obviously, power may be taken off directly from the shaft 28 of the primary turbine rotor 34 which obviously will receive the biggest part of the power of the combustion products, although if desired, this shaft may be held stationary and its vanes 52 and 54 will act as diffuser blades, whereby all of the power of the combustion products may be imparted by the escaping exhaust gases to the oppositely rotating turbine 78 and to the multi-stage air compressor vanes as above mentioned. Obviously, the invention as so far described is of versatile use for aeronautical devices, since a propeller or the like may be operated by the power take-off shaft 28, while the exhaust products after operating the compressor vanes are then discharged through the rear passageways of the device and may be employed as jet propulsion means, or to operate any other type of exhaust turbine as desired.

Particular attention should be directed to the construction wherein the freely revolving turbine rotors may be readily removed from the engine casing 10 by merely removing the detachable section 12 therefrom and pulling or withdrawing the rotor assembly which is frictionally retained within the casing solely by the rings 68 and 70. By this means, ready replacement may be made as necessary, easy servicing may be had of the various parts, and ready inspection thereof may be made with a minimum of time and labor being consumed thereby.

It should be here noted that the incoming air, or fuel and air mixture, are inducted closely adjacent to and surrounding the central shaft of the device, whereby the relatively cool air or gas mixture will serve to cool the shafts, and the surrounding exhaust turbine blades, while the exhaust products are discharged at the outer circumference of the rotors, to obtain the maximum turning moment thereon, and also to prevent any leakage centrifugally and radially outwardly of the rotors from contaminating the incoming charge. In this arrangement, any leakage arising from centrifugal forces and between adjacent surfaces of adjacent rotors, will move radially outwardly from the inlet passages into the exhaust passages, whereby the same will serve to further cool the rotor construction, and merely augment the combustion products passing through the exhaust turbine blades. It should be here noted and in accordance with conventional practice, and as shown in Figure 2, each of the longitudinally disposed and circumferentially arranged exhaust passages extending through the series of rotor blades is of gradually increasing diameter as it approaches its discharge end, to thereby better utilize the cooling and the slowing velocity of the expanding exhaust gases, while the inlet passages are reversely proportioned to constitute a Venturi effect for charging the combustion chamber 20.

As will be noted upon Figure 2, suitable seating means are provided between the adjacent surfaces of the various rotors. Thus, an annular rib and groove sealing means indicated at 88 may be provided between adjacent surfaces of any of the hubs 34 and 78, while a labyrinthine seal may be incorporated between the adjacent surfaces of any of the hubs 48 and 80, these same sealing means being employed between the rotor 34 and its sealing engagement with the stationary sleeves 18, 24 and 44.

Where liquid injection of fuel is employed in the turbine, the same may be supplied from a fuel pressure manifold of annular type as indicated at 92 in Figure 1, individual feed pipes 94 serving to communicate fuel from the annular manifold 92 to the individual fuel nozzle 22. Suitable control means may be provided for regulating the quantity of fuel supplied to the combustion chamber 20 through the nozzles 22, it being understood that it is contemplated that a continuous pressure of combustion shall be maintained in said combustion chamber.

From the foregoing, numerous modifications and embodiments will be readily apparent to those skilled in the art after consideration of the foregoing specification and accompanying drawings, accordingly, it is not desired to limit the invention to the exact construction shown and described, but all suitable modifications and equivalents may be resorted to falling within the scope of the appended claims.

Having thus described the invention, what is claimed as new is:

1. A turbine comprising a casing, a sleeve carried by said casing and extending axially thereof and defining therewith an annular combustion chamber therein, a power shaft journaled in said axial sleeve and having a first turbine rotor fixedly secured thereto, vanes on said first turbine rotor registering with said combustion chamber, a rotor shaft, means mounting said rotor shaft in said casing in end-to-end spaced alignment with said power shaft, a plurality of turbine rotors each journaled upon said rotor shaft in side-by-side relation for independent rotation, vanes on each of said plurality of rotors registering with the vanes of said first rotor, the vanes on adjacent rotors of said plurality of rotors being reversely inclined for a continuous direction of fluid flow whereby adjacent rotors are rotatable in opposite directions, said rotor shaft and plurality of rotors constituting a unitary removable assembly in said casing, the vanes of said first rotor and of said plurality of rotors being disposed in inner radial sets of registering compressor vanes constituting a fluid inlet supply means for said combustion chamber and outer radial sets of registering turbine vanes comprising fluid exhaust means for said combustion chamber, means for supplying fuel to said combustion chamber, said rotor shaft mounting means having concentric annular passages each registering with one of said radial sets of vanes, said casing having concentric fluid inlet and outlet passages at one end thereof registering with said concentric annular passages.

2. A turbine comprising a casing, a sleeve carried by said casing and extending axially thereof and defining therewith an annular combustion chamber therein, a power shaft journaled in said axial sleeve and having a first turbine rotor fixedly secured thereto, vanes on said first turbine rotor registering with said combustion chamber, a rotor shaft, means mounting said rotor shaft in said casing in end-to-end spaced alignment with said power shaft, a plurality of turbine rotors each journaled upon said rotor shaft in side-by-side relation for independent rotation, vanes on each of said plurality of rotors registering with the vanes of said first rotor, the vanes on adjacent rotors of said plurality of rotors being reversely inclined for a continuous direction of fluid flow whereby adjacent rotors are rotatable in opposite directions, said rotor shaft and plurality of rotors constituting a unitary removable assembly in said casing, the vanes of said first rotor and of said plurality of rotors being disposed in inner radial sets of registering compressor vanes constituting a fluid inlet supply means for said combustion chamber and outer radial sets of registering turbine vanes comprising fluid exhaust means for said combustion chamber, means for supplying fuel to said combustion chamber, said rotor shaft mounting means having concentric annular passages each registering with one of said radial sets of vanes, said casing having concentric fluid inlet and outlet passages at one end thereof registering with said concentric annular passages, said mounting means including a pair of concentric sleeves disposed axially of said casing, the inner of said concentric sleeves having said rotor shaft fixedly secured thereto at one end of said rotor shaft, the outer of said concentric sleeves having means for securing the same to said casing.

3. A turbine comprising a casing, a sleeve carried by said casing and extending axially thereof and defining therewith an annular combustion chamber therein, a power shaft journaled in said axial sleeve and having a first turbine rotor fixedly secured thereto, vanes on said first turbine rotor registering with said combustion chamber, a rotor shaft, means mounting said rotor shaft in said casing in end-to-end spaced alignment with said power shaft, a plurality of turbine rotors each journaled upon said rotor shaft in side-by-side relation for independent rotation, vanes on each of said plurality of rotors registering with the vanes of said first rotor, the vanes on adjacent rotors of said plurality of rotors being reversely inclined for a continuous direction of fluid flow whereby adjacent rotors are rotatable in opposite directions, said rotor shaft and plurality of rotors constituting a unitary removable assembly in said casing, the vanes of said first rotor and of said plurality of rotors being disposed in inner radial sets of registering compressor vanes constituting a fluid inlet supply means for said combustion chamber and outer radial sets of registering turbine vanes comprising fluid exhaust means for said combustion chamber, means for supplying fuel to said combustion chamber, said rotor shaft mounting means having concentric annular passages each registering with one of said radial sets of vanes, said casing having concentric fluid inlet and outlet passages at one end thereof registering with said concentric annular passages, said mounting means including a pair of concentric sleeves disposed axially of said casing, the inner of said concentric sleeves having said rotor shaft fixedly secured thereto at one end of said rotor shaft, the outer of said concentric sleeves having means for securing the same to said casing comprising a pair of rings concentrically surrounding and spaced from said outer concentric sleeve and spaced longitudinally thereof, said rings having fastening engagement with said casing, radial webs securing said rings to said outer concentric sleeve, the space between the latter and the casing comprising the outermost of said concentric annular passages.

HARRY C. STEELE.

References Cited in the file of this patent

UNITED STATES PATENTS

| Number | Name | Date |
|---|---|---|
| 1,288,360 | Zaar | Dec. 17, 1918 |
| 2,188,546 | Thiesen | Jan 30, 1940 |
| 2,409,177 | Allen | Oct. 15, 1946 |
| 2,413,225 | Griffith | Dec. 24, 1946 |
| 2,426,098 | Heppner | Aug. 19, 1947 |
| 2,428,330 | Heppner | Sept. 30, 1947 |
| 2,430,398 | Heppner | Nov. 4, 1947 |
| 2,441,488 | Howell | May 11, 1948 |
| 2,454,738 | Hawthorne | Nov. 23, 1948 |
| 2,505,660 | Baumann | Apr. 25, 1950 |